United States Patent [19]

Donowski

[11] Patent Number: 5,709,624
[45] Date of Patent: Jan. 20, 1998

[54] VARIABLE EFFECTIVE DIAMETER PULLEY

[75] Inventor: Steven Donowski, Halesowen, England

[73] Assignee: GKN Technology Limited, West Midlands, England

[21] Appl. No.: 553,577

[22] PCT Filed: May 24, 1994

[86] PCT No.: PCT/GB94/01131

§ 371 Date: Feb. 5, 1996

§ 102(e) Date: Feb. 5, 1996

[87] PCT Pub. No.: WO94/29616

PCT Pub. Date: Dec. 22, 1994

[30] Foreign Application Priority Data

Jun. 3, 1993 [GB] United Kingdom ............. 9311499

[51] Int. Cl.⁶ ................................................ F16H 55/52
[52] U.S. Cl. ...................... 474/8; 474/87; 474/141; 474/148
[58] Field of Search ........................... 474/8, 84–87, 474/141, 148, 150

[56] References Cited

U.S. PATENT DOCUMENTS

| 2,952,167 | 9/1960 | Nelson | 474/35 X |
| 3,590,649 | 7/1971 | Fischer | 474/19 |

FOREIGN PATENT DOCUMENTS

| 1172466 | 11/1959 | France . |
| 1353802 | 1/1964 | France . |
| 2253953 | 4/1975 | France . |
| 2271457 | 12/1975 | France . |
| 705443 | 3/1954 | United Kingdom . |

*Primary Examiner*—Roger J. Schoeppel
*Attorney, Agent, or Firm*—Arnold B. Silverman; Benjamin T. Queen, II; Eckert Seamans Cherin & Mellott, LLC

[57] ABSTRACT

A drive arrangement includes an endless flexible drive element which cooperates with a pulley of variable effective diameter having two sheave members and a drive ring between the sheave members and able to run eccentrically when the sheave members move apart. The drive arrangement also includes a stabilising member for cooperating with the drive ring so as to maintain the axis of rotation of the drive ring at least substantially parallel to the axis of rotation of the sheave members.

19 Claims, 2 Drawing Sheets

VARIABLE EFFECTIVE DIAMETER PULLEY

DESCRIPTION OF INVENTION

This invention relates to a drive arrangement including an endless flexible drive element such as a belt, and a pulley with which the flexible drive element co-operates and whose effective diameter is variable in order to achieve a variable transmission ratio between the pulley and another pulley or pulleys with which the flexible drive element co-operates.

More particularly, the invention relates to a drive arrangement including a pulley which comprises a pair of sheave members rotatable about an axis and supported for movement relative to one another in the direction along said axis, the sheave members having generally frusto-conical driving surfaces facing one another to define a generally V-section annular groove therebetween; and a drive ring disposed between the sheave members and having an external circumferential surface engageable by the flexible drive element and side surfaces engaging said facing generally frusto-conical driving surfaces of the sheave members, the drive ring being constrained between the sheave members and being able to assume an eccentric position relative thereto when permitted by the dimensions of the groove defined between the sheave members, in accordance with their relative axial position. A drive arrangement incorporating such a pulley of variable effective diameter will be hereinafter referred to as a drive arrangement of the kind specified.

As the distance between the driving surfaces of the sheave members increases (i.e. the V-section groove therebetween becomes wider) the drive ring is able to assume an increasingly eccentric position relative to the sheave members, and is forced to do so by the tension of the flexible drive element entrained around it. It may be the tension in the drive element which causes the drive ring to assume an eccentric position and force the sheave members apart. As the speed at which the drive ring is driven by the sheave members is dependent on the effective diameter at which they are engaged by the drive ring, the effective diameter of the pulley is decreased as the eccentricity of the drive ring increases.

A drive arrangement of the kind specified may comprise the auxiliary drive system of an internal combustion engine for a motor vehicle. It is usual to arrange for the auxiliary, which may comprise one or more of the following, namely an alternator, water pump, cooling fan, power steering pump, air conditioning pump, and so on, to be driven from the engine crankshaft by a belt. If a pulley of variable effective diameter is provided on the engine crankshaft, a variable transmission ratio may be provided between the crankshaft and the auxiliary so that the latter can be driven at a reasonably high speed when the engine is running slowly, and yet not be over-speeded when the engine is being operated at its maximum speed. A means for maintaining the required tension in the drive belt, or for causing a speed-dependent increase in belt tension, is, of course, additionally required in the drive arrangement.

One problem which can arise in a drive arrangement of the kind specified is that the drive ring may, instead of running stably in an eccentric position, be unstable in that the axis of rotation of the drive ring does not remain exactly parallel to the axis about which the sheave members rotate. The drive ring can tend to tilt or wobble, which leads to wear in the pulley. It is an object of the present invention to solve or at least reduce this problem in a drive arrangement of the kind specified.

According to the present invention, we provide a drive arrangement of the kind specified wherein there is provided stabilising means co-operating with the drive ring so as to maintain the axis of rotation of the drive ring parallel or substantially parallel to the axis of rotation of the sheave members.

Preferably the stabilising means engages a peripheral region of the drive ring, preferably said circumferential surface thereof engageable by the drive element.

Preferably the stabilising means comprises a stabilising roller member which is rotatable about an axis and is supported such that the axis of rotation of the stabilising roller member can move towards and away from the axis of rotation of the sheave members as the eccentricity of the drive ring changes. For example, the stabilising roller member may be provided on an arm which is pivotable so as to move the axis of rotation of the stabilising roller member relative to the axis of rotation of the sheave members. Such arm is preferably pivoted about an axis fixed relative to the axis of rotation of the sheave members.

Preferably the stabilising roller member is spring biased into engagement with the drive ring.

The stabilising roller member may have form-fitting engagement with the drive ring. For example, if the drive ring has a circumferential surface engageable by a drive belt of so-called poly-vee type, the ring presenting a number of V-section annular grooves, the stabilising roller member may have a peripheral surface corresponding to the cross-sectional shape of such a drive belt or part of such a drive belt, to co-operate with the circumferential surface of the drive ring.

Alternatively, the stabilising roller member may have a periphery which co-operates frictionally with the drive ring. For example, the stabilising member may simply have a cylindrical periphery which when engaging the drive ring has a stabilising effect thereon.

The invention will now be described by way of example with reference to the accompanying drawings, in which FIG. 1 is a diagrammatic view of a drive arrangement according to the invention, as applied to an internal combustion engine;

Figure 1:
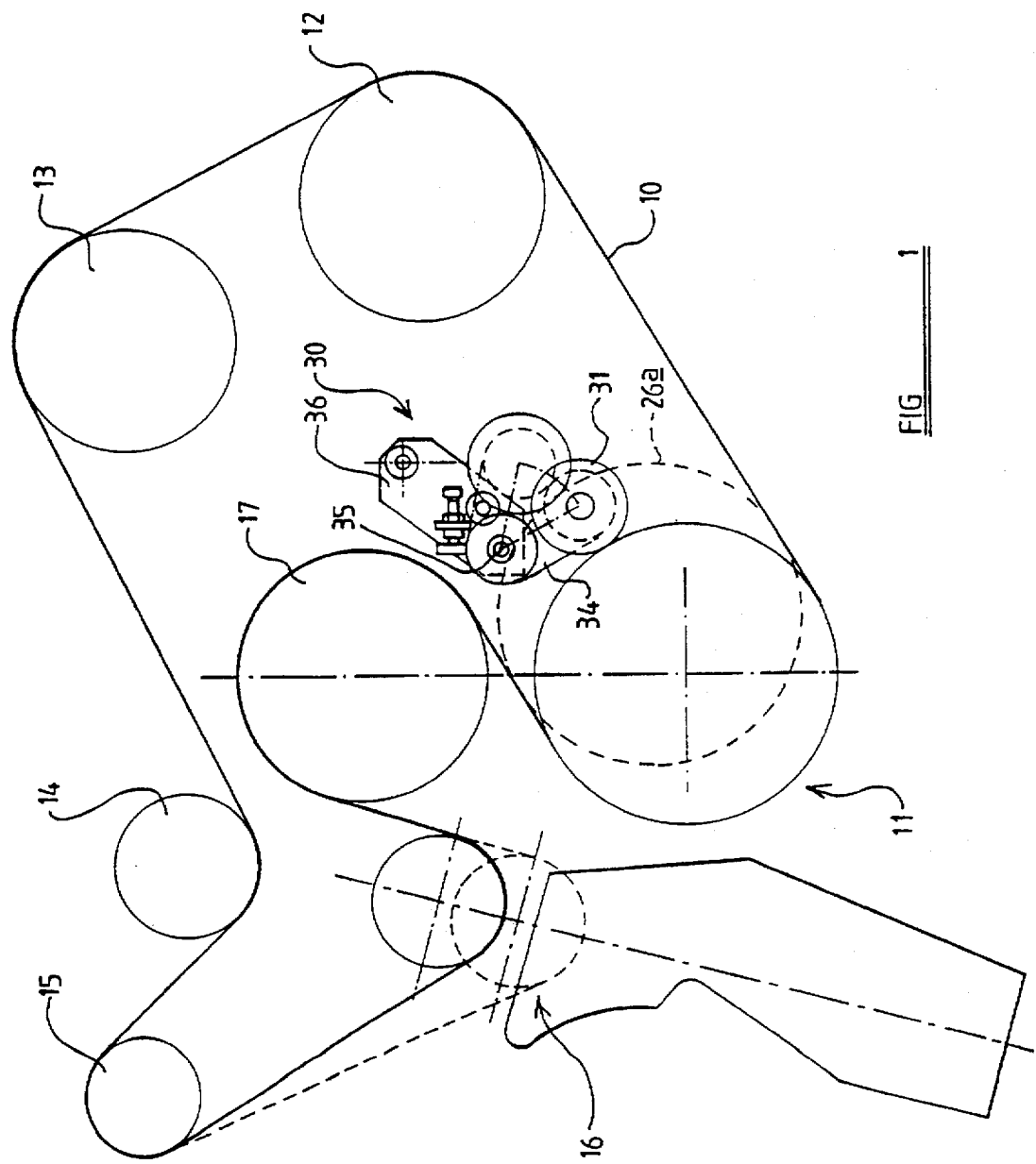

Referring firstly to FIG. 1 of the drawings, this shows diagrammatically the auxiliary drive system of an internal combustion engine provided in a motor vehicle. It comprises an endless flexible drive element, namely a belt 10, entrained around a number of pulleys of which a first pulley, indicated generally at 11, is provided on the crankshaft of the internal combustion engine. The further pulleys around which the belt 10 is entrained in a serpentine path are the pulleys of a power steering pump 12, an air conditioning pump 13, an idler pulley 14, an alternator 15, a tensioner 16, and a water pump 17.

Figure 2:
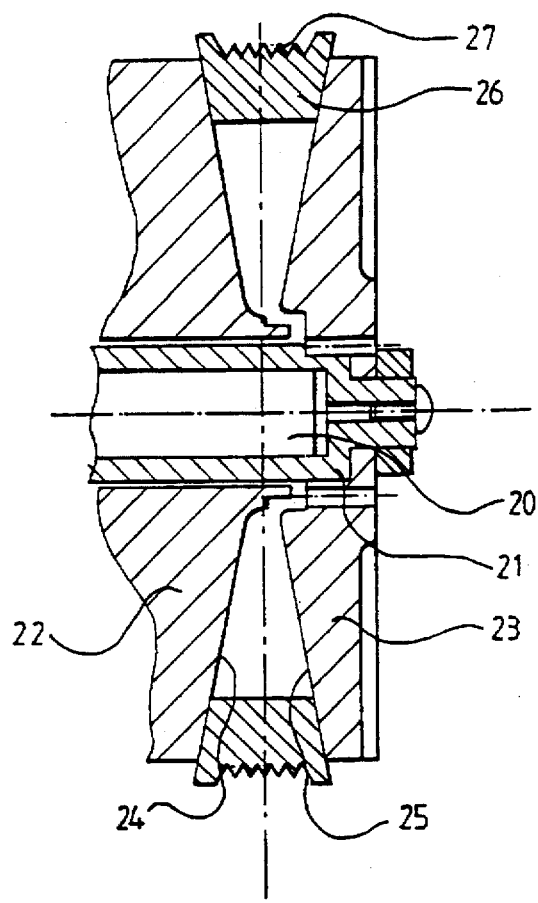
FIG. 2 shows diagrammatically, part of a pulley of variable effective diameter forming part of the drive arrangement.

The configuration of the pulley 11 on the crankshaft of the engine is shown diagrammatically but in greater detail in FIG. 2. A shaft 20 connected to the crankshaft of the engine supports, by way of an intermediate sleeve 21, two sheave members 22, 23 which have facing generally frusto-conical driving surfaces 24, 25 respectively. The surfaces 24, 25 may be exactly frusto-conical or differ to some extent from such configuration, e.g. by having a curvature as viewed in section. The two sheave members are movable relative to one another along their rotational axis which is coincident with the axis of the crankshaft of the engine, so that the generally V-section annular groove defined between the driving surfaces 24, 25 is able to vary in width. Between the two sheave members there is disposed a drive ring 26 which has an external circumferential surface 27 for engagement by the belt 10 and side surfaces which engage the facing driving surfaces 24, 25 of the sheaves 22, 23. In FIG. 2 the sheaves are shown in a relative position to which they are urged by spring means (not shown), so that the groove defined between them is of its minimum width and the drive ring 26 is constrained to run concentrically with the sheaves. It will be appreciated that if the width of the V-section annular groove between the sheaves is increased the drive ring is able to run eccentrically compared with the sheaves, engaging the sheaves at a smaller diameter and thus reducing the effective diameter of the pulley.

In practice, such eccentric running of the drive ring is forced to take place by an increase in the tension in the belt 10, as controlled by the tensioner 16. When the belt tension is increased there comes a point at which the force exerted in the axial direction between the sheaves by the drive ring exceeds the force of the spring means urging the sheaves together, so that the sheave members are forced apart and the drive ring runs eccentrically. FIG. 1 shows in broken lines the position of the tensioner pulley 16 when such an increase in tension has been applied, and the eccentric position of the drive ring is shown in broken lines at 26a. The tensioner is arranged to operate in response to engine speed, so that when the engine is running at low speed the drive ring is in its concentric position, as seen in FIG. 2, and the auxiliaries are driven quickly relative to the engine, whilst when the engine speed increases the drive ring is caused to assume its eccentric position so the auxiliaries are driven less quickly relative to the speed at which the engine is running.

Figure 3:
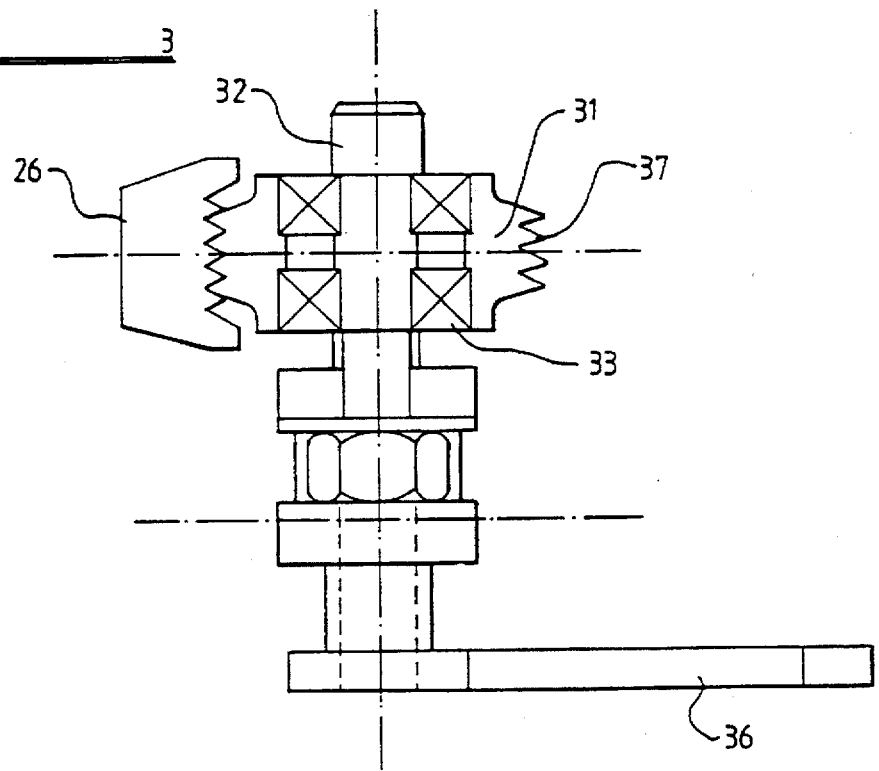
FIG. 3 shows the stabilising member of the drive arrangement.

To maintain the drive ring 26 such that its axis of rotation is parallel or as close as possible to parallel to the axis of rotation of the sheave members 22, 23, there is provided a stabilising means indicated generally at 30 in FIG. 1 and partially shown in greater detail in FIG. 3. The stabilising means comprises a stabilising member in the form of a roller 31 carried on a spindle 32 by bearings 33. The spindle 32 is supported on an arm 34 pivotable about an axis 35 on a mounting plate 36 which is fitted, e.g. to the engine. Pivoting of the arm 34 moves the spindle 32, which carries the stabiliser member 31, towards and away from the axis of the sheave members 22, 23 of the crankshaft pulley 11. Spring biasing means, not shown, is provided for biasing the stabilising member 31 into engagement with the circumferential surface of the drive ring.

As shown in FIG. 3, the stabilising member 31 has a peripheral surface 37 which has form-fitting engagement with the circumferential surface 27 of the drive ring 26. Thus, the stabilising member supports the drive ring to prevent the latter from wobbling and its axis from becoming inclined to the axis of the sheave members.

As an alternative to the provision on the stabiliser member 31 of a peripheral surface 37 having form-fitting engagement with the circumferential surface 27 of the drive ring 26, the stabilising member may have a peripheral surface, e.g. of simple cylindrical configuration, which has frictional engagement with the external circumference of the drive ring. Such engagement exerts sufficient stabilising influence on the drive ring to prevent the latter from tilting or wobbling.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

I claim:

1. A drive arrangement including an endless flexible drive element; a first pulley with which the flexible drive element cooperates, said first pulley comprising a pair of sheave members rotatable about an axis and supported for movement relative to one another in the direction along said axis, the sheave members having generally frusto-conical driving surfaces facing one another to define a generally V-section annular groove therebetween; at least one further pulley with which the flexible drive element cooperates; a drive ring disposed between the sheave members and having an external circumferential surface engaged by the flexible drive element and further having respective side surfaces engaging said facing generally frusto-conical driving surfaces of the sheave members, the drive ring having an axis of rotation and being constrained between the sheave members and being able to assume an eccentric position relative thereto with said axis of rotation of the drive ring offset from said axis of the sheave members when permitted by the dimensions of the V-section annular groove defined between the sheave members in accordance with the relative axial position of the sheave members; and wherein there is provided stabilising means engaging the drive ring so as to maintain the axis of rotation of the drive ring at least substantially parallel to the axis of rotation of the sheave members.

2. A drive arrangement according to claim I wherein the stabilising means engages a peripheral region of the drive ring.

3. A drive arrangement according to claim 2 wherein said stabilising means engages said circumferential surface of the drive ring.

4. A drive arrangement according to claim 3 wherein said stabilising means comprises a stabilising roller member which is rotatable about a stabilising member axis and is supported such that the stabilising member axis of rotation can move towards and away from the axis of rotation of the sheave members as the eccentricity of the drive ring changes.

5. A drive arrangement according to claim 2 wherein said stabilising means comprises a stabilising roller member which is rotatable about a stabilising member axis and is supported such that the stabilising member axis of rotation can move towards and away from the axis of rotation of the sheave members as the eccentricity of the drive ring changes.

6. A drive arrangement according to claim 5 wherein the stabilising roller member has a periphery which cooperates frictionally with the drive ring.

7. A drive arrangement according to claim 5 wherein the stabilising roller member has form-fitting engagement with the drive ring.

8. A drive arrangement according to claim 7 wherein the flexible drive element comprises a poly-V belt (of poly-vee type), the drive ring defining on said circumferential surface of the drive ring a plurality of V-section annular grooves and the stabilising roller member having a peripheral surface with a cross-sectional shape affording a plurality of V-section annular projections for engaging at least some of said V-section annular grooves of the drive ring.

9. A drive arrangement according to claim 5 wherein the stabilising roller member is provided on an arm which is pivotable so as to move the stabilising member axis of rotation member relative to the axis of rotation of the sheave members.

10. A drive arrangement according to claim 9 wherein the stabilising roller member has form-fitting engagement with the drive ring.

11. A drive arrangement according to claim 9 wherein the stabilising roller member has a periphery which cooperates frictionally with the drive ring.

12. A drive arrangement including an endless flexible drive element; a pulley which comprises a pair of sheave members rotatable about an axis and supported for movement relative to one another in the direction along said axis, the sheave members having generally frusto-conical driving surfaces facing one another to define a generally V-section annular groove therebetween; a drive ring disposed between the sheave members and having an external circumferential surface engaged by the flexible drive element and further having respective side surfaces engaging said facing generally frusto-conical driving surfaces of the sheave members, the drive ring having an axis of rotation and being constrained between the sheave members and being able to assume an eccentric position relative thereto when permitted by the dimensions of the V-section annular groove defined between the sheave members in accordance with the relative axial position of the sheave members; wherein there is provided stabilising means co-operating with the drive ring so as to maintain the axis of rotation of the drive ring at least substantially parallel to the axis of rotation of the sheave members; and said drive arrangement further comprising an auxiliary drive system of an internal combustion engine of a motor vehicle.

13. A drive arrangement including an endless flexible drive element; a pulley which comprises a pair of sheave members rotatable about an axis and supported for movement relative to one another in the direction along said axis, the sheave members having generally frusto-conical driving surfaces facing one another to define a generally V-section annular groove therebetween; a drive ring disposed between the sheave members and having a peripheral region with an external circumferential surface engaged by the flexible drive element and further having respective side surfaces engaging said facing generally frusto-conical driving surfaces of the sheave members, the drive ring having an axis of rotation and being constrained between the sheave members and being able to assume an eccentric position relative thereto when permitted by the dimensions of the V-section annular groove defined between the sheave members in accordance with the relative axial position of the sheave members; wherein there is provided stabilising means co-operating with the drive ring so as to maintain the axis of rotation of the drive ring at least substantially parallel to the axis of rotation of the sheave members, said stabilising means engaging said circumferential surface of the peripheral region of the drive ring; and said drive arrangement further comprising an auxiliary drive system of an internal combustion engine of a motor vehicle.

14. A drive arrangement including an endless flexible drive element; a pulley which comprises a pair of sheave members rotatable about an axis and supported for movement relative to one another in the direction along said axis, the sheave members having generally frusto-conical driving surfaces facing one another to define a generally V-section annular groove therebetween; a drive ring disposed between the sheave members and having an external circumferential surface engaged by the flexible drive element and further having respective side surfaces engaging said facing generally frusto-conical driving surfaces of the sheave members, the drive ring having an axis of rotation and being constrained between the sheave members and being able to assume an eccentric position relative thereto when permitted by the dimensions of the V-section annular groove defined between the sheave members in accordance with the relative axial position of the sheave members; wherein there is provided stabilising means co-operating with the drive ring so as to maintain the axis of rotation of the drive ring at least substantially parallel to the axis of rotation of the sheave members, wherein the stabilising means engages a peripheral region of the drive ring, said stabilising means comprising a stabilising roller member which is rotatable about a stabilising member axis and is supported such that the stabilising member axis of rotation can move towards and away from the axis of rotation of the sheave members as the eccentricity of the drive ring changes, the stabilising roller member being provided on an arm which is pivotable so as to move the stabilising member axis of rotation relative to the axis of rotation of the sheave members; and said drive arrangement further comprising an auxiliary drive system of an internal combustion engine of a motor vehicle.

15. An auxiliary drive system of an internal combustion engine of a motor vehicle, said auxiliary drive system including:

a crankshaft pulley and at least one further pulley, said at least one further pulley being connected to at least one respective auxiliary item of equipment;

an endless flexible drive element cooperating with said crankshaft pulley and said at least one other pulley;

said crankshaft pulley being of variable effective diameter to provide a variable transmission ration between said crankshaft pulley and said at least one other pulley, said crankshaft pulley comprising:

a pair of sheave members;

means supporting said sheave members for rotation about an axis and for movement relative to one another along said axis, the sheave members having generally frusto-conical driving surfaces facing one another to define a generally V-section annular groove therebetween;

a drive ring disposed between the sheave members and having an external circumferential surface engaged by the flexible drive element and further having respective side surfaces engaging said facing generally frusto-conical driving surfaces of the sheave members, the drive ring having an axis of rotation and being constrained between the sheave members and being able to assume an eccentric position relative thereto with said axis of rotation of the drive ring offset from said axis of the sheave members, when permitted by the dimensions of said V-section annular groove defined between the sheave members in accordance with the relative axial position of the sheave members; and the drive arrangement further comprising a stabilising member engaging the drive ring for maintaining said axis of rotation of the drive ring at least substantially parallel to said axis of the sheave members.

16. An auxiliary drive system according to claim 15 wherein said stabilising member comprises a roller member;

means supporting said roller member for rotation about a stabilising member axis;

means supporting said roller member for movement of said stabilising member axis towards and away from said axis of the sheave members.

17. An auxiliary drive system according to claim 16 wherein said means supporting the roller member comprises a pivotable arm.

18. An auxiliary drive system according to claim 16 wherein said roller member has form-fitting engagement with the drive ring.

19. An auxiliary drive system according to claim 18 wherein said flexible drive element comprises a poly-V belt; the drive ring defines on its circumferential surface a plurality of V-section annular grooves; and the roller member has a peripheral surface with a cross-sectional shape affording a plurality of V-section annular projections for engaging at least some of said V-section annular grooves of the drive ring.

* * * * *

UNITED STATES PATENT AND TRADEMARK OFFICE
CERTIFICATE OF CORRECTION

PATENT NO. : 5,709,624

DATED : January 20, 1998

INVENTOR(S) : STEVEN DONOWSKI

It is certified that error appears in the above-identified patent and that said Letters Patent is hereby corrected as shown below:

In claim 9, column 5, line 2, "member" should be deleted.

Signed and Sealed this

Fifteenth Day of May, 2001

Attest:

Attesting Officer

NICHOLAS P. GODICI

Acting Director of the United States Patent and Trademark Office